United States Patent [19]

Detroit

[11] 4,088,640
[45] May 9, 1978

[54] OZONATED LIGNOSULFONATES

[75] Inventor: William John Detroit, Schofield, Wis.

[73] Assignee: American Can Company, Greenwich, Conn.

[21] Appl. No.: 697,541

[22] Filed: Jun. 18, 1976

[51] Int. Cl.² .............................................. C07G 1/00
[52] U.S. Cl. .................................. 260/124 R; 8/89 R; 106/85; 106/55
[58] Field of Search .................... 260/124 A, 124 R

[56] References Cited

U.S. PATENT DOCUMENTS

| | | | |
|---|---|---|---|
| 2,680,113 | 6/1954 | Adler et al. | 260/124 R |
| 2,935,473 | 5/1960 | King et al. | 260/124 |
| 3,167,523 | 1/1965 | Dimitri | 260/124 R |
| 3,171,811 | 3/1965 | Keirstead et al. | 260/124 R |
| 3,278,425 | 10/1966 | King et al. | 260/124 R |
| 3,325,426 | 6/1967 | Markham | 260/124 A |

FOREIGN PATENT DOCUMENTS 694,665  12/1950  United Kingdom ................. 260/124

OTHER PUBLICATIONS

Sarkanen et al., "Lignins", pp. 451, 471, 799, 821.

Primary Examiner—Delbert R. Phillips
Attorney, Agent, or Firm—Robert P. Auber; George P. Ziehmer; Ira S. Dorman

[57] ABSTRACT

Valuable new and widely useful compositions of matter are comprised of products having enhanced solubility and increased dispersant and the like surfactant activity which products are ozonated (so as to be oxidized) lignosulfonate derivatives beneficially including ozonated units of alkaline oxidized, hydrolyzed, partially desulfonated lignosulfonates.

30 Claims, 1 Drawing Figure

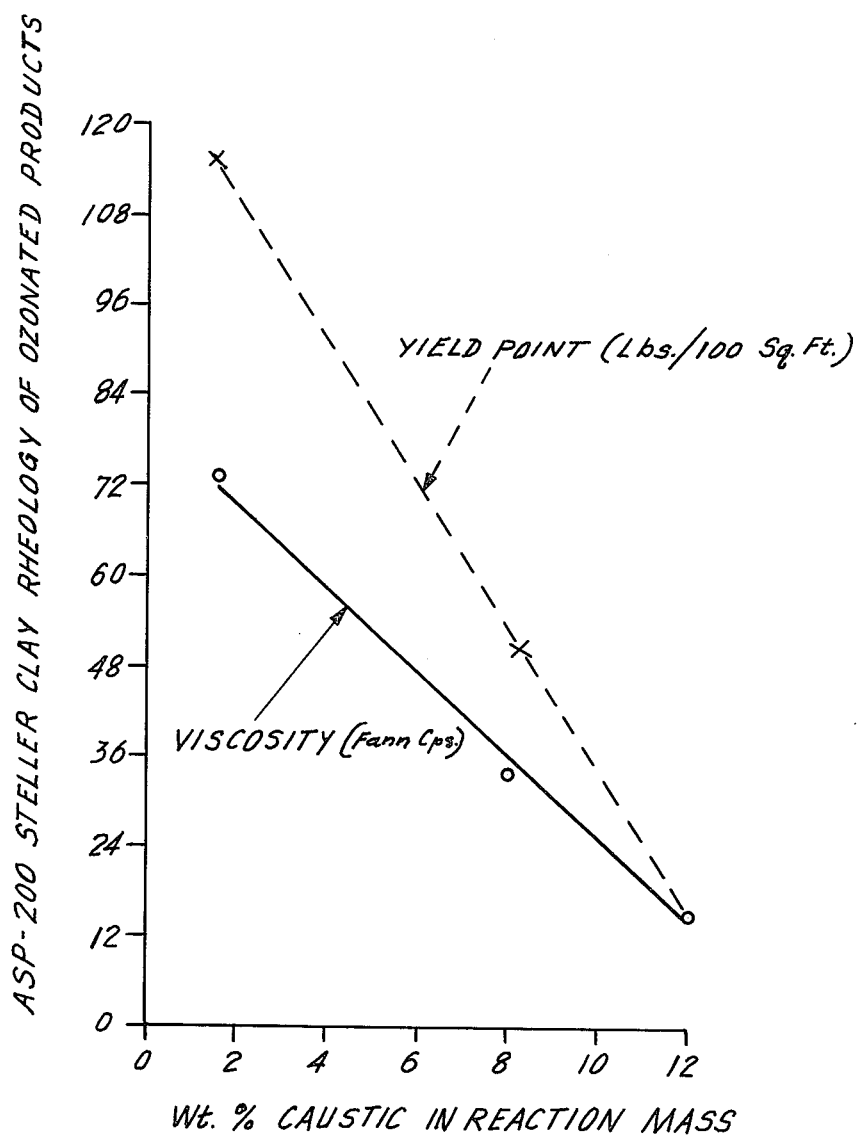

OZONATED LIGNOSULFONATES

BACKGROUND OF THE INVENTION

Various and numerous sulfonated and otherwise derived lignin materials have already been found, known and developed and advantageously applied for many useful and beneficial purposes.

Numerous references are available dealing in one way or another with the identity and nature of lignin, per se and many of the derivatives of lignin including lignosulfonates (all of which, by the way, are, generally, relatively imprecise and not positively definite), preparation and numerous uses of such materials, substantial information thereon may be found, by way of illustration, in U.S. Pats. Nos. 1,848,292; 2,371,136; 2,371,137; 2,491,832; 2,505,304; 2,576,418; 2,598,3``, 2,800.449; 3,087,923; 3,156,520; and 3,726,850. Still additional art of interest is uncovered in U.S. Pats. Nos. Re. 18,268 2,057,117; 2,104,701; 2,399,607; and 2,434,626.

Another excellent informational source in this area is the Bulletin (No. 131) published by AMERICAN CAN COMPANY of Greenwich, Connecticut 06830 (U.S.A.) entitled "Chemicals From Wood".

The lignosulfonates which are utilized as the starting materials in practice of and to obtain the novel ozonated compositions of the present invention are the treated or untreated spent sulfite liquors (i.e., containing the desired effluent lignosulfonate solids) obtained from wood conversion as the sulfite waste pulping liquor. These, as indicated, may be ozonated in the "as is" or whole liquor condition. Or, and oftentimes with advantage, they may be ozonated as a purified lignosulfonate material from or in which the sugars and other saccharide constituents have been removed and/or destroyed or, additionally, inorganic constituents have also been partially or fully eliminated. As a further alternative, the lignosulfonate material that is ozonated may be one of the desulfonated lignosulfonates (including substantially pure lignosulfonate compositions) which are generally obtained by catalytic — frequently alkaline — oxidation processes conducted under conditions of high temperature and pressure, oftentimes with accompanying hydrolysis.

Where alkaline oxidized, hydrolyzed, partially desulfonated lignosulfonates are utilized as the starting materials in practice of and to obtain the novel ozonated compositions of the present invention, they are usually most readily and conveniently obtained pursuant to the teachings of U.S. Pat. No. 2,491,832.

In this connection, the lignosulfonate material that is utilized for ozonization may be, and frequently with great benefit, is a resulfonated desulfonated lignosulfonate product of the type prepared according to the teachings and disclosures of the present Applicant's copending Application with another co-Applicant for U.S. Letters Patent entitled "SOLUBILIZED RESULFONATED LIGNOSULFONATES" having Ser. No. 671,397 which was filed Mar. 29, 1976 (wherein there are also described various of the lignosulfonate materials that are suitable to be ozonated in practice of the present invention).

In general, the lignosulfonates are anionic polyelectrolytes with a relative molecular size usually on the order of 1,000 to 20,000 and from which the ozonated products are obtained according to the instant invention. They generally have an organic sulfonic sulfur, i.e., —$SO_3$, content calculated as percent sulfur by weight of broadly between about ½ and about 15 wt. %. More advantageously for many purposes, this sulfur range is between about 1 ½ or 1 ¾ and about 10 wt. %; while quite often it is preferable for the partially desulfonated lignosulfonate to contain from about 2 to about 8 wt. % of the combined sulfur which represents its appearance in the sulfonic form.

Many of the lignosulfonates that are advantageously ozonated according to practice of the present invention are obtained in waste pulping liquors derived from a totally, or at least substantially, softwood source. However, excellent ozonated lignosulfonate products are also prepared from hardwood starting materials.

Good examples of lignosulfonate products of various types which are commercially available from AMERICAN CAN COMPANY include those having the Trademarks "MARASPERSE C21", "MARASPERSE CB" and "MARASPERSE N-22". These are generally derived from softwood sulfite waste pulping liquors, with "MARASPERSE N-22" being considerably refined as to sugars and certain inorganics contents and "MARASPERSE CB" being a sulfonated spent oxidized liquor residue from a vanillin recovery process as taught in the above-identified U.S. Pat. No. 2,491,832.

As usually available, these commercial ignosulfonates generally have the following typical analyses and physical characteristics features: TYPICAL ANALYSIS (Moisture-Free and Wt. % Basis):

|  | "MARASPERSE C-21" | "MARASPERSE CB" | "MARASPERSE N-22" |
|---|---|---|---|
| pH-3% Solution | 7.0–8.2 | 8.5–9.2 | 7.5–8.5 |
| Total Sulfur as S, % | 6.8 | 2.6 | 7.3 |
| Sulfate Sulfur as S, % | 0.3 | 0.1 | 1.0 |
| Sulfite Sulfur as S, % | 0.09 | 0 | 0.12 |
| CaO, % | 5.2 | 0.03 | 0.55 |
| MgO, % | 0.3 | Trace | 0.3 |
| $Na_2O$, % | 6.1 | 9.9 | 13.2 |
| Reducing sugars, % | 1.5 | 0 | 0.8 |
| $OCH_3$, % | 7.9 | 12.7 | 7.7 |

| PHYSICAL CHARACTERISTICS | | | |
|---|---|---|---|
| Usual Form | Powder | Powder | Powder |
| Moisture Content (Max., % $H_2O$) | 7.5 | 8.0 | 7.0 |
| Color | Brown | Black | Brown |
| Bulk Density (lbs./cu. ft.) | 35–40 | 43–47 | 35–40 |
| Solubility in Water (%) | 100 | 100 | 100 |
| Solubility in Oils and Most Organic Solvents (%) | 0 | 0 | 0 |
| Surface Tension, 1% Sol'n (in dynes/cm) | ca. 49.4 | ca. 51.4 | ca. 52.8 |

Another good lignosulfonate material (also commercially available from AMERICAN CAN COMPANY) is a hardwood lignosulfonate known as MARASPERSE (TM) N-42 lignosulfonate. This material has an analysis and characteristics generally quite analogous to those of MARASPERSE (TM) N-22 lignosulfonate. NORLIG (TM) 41 lignosulfonate, likewise commercially available from AMERICAN CAN COMPANY, is a still further illustration of a crude spent sulfite lignosulfonate material that is advantageously benefited in accordance with practice of the present invention (its typical analyses and characteristics being set forth in the above-identified Bulletin No. 131).

While the known lignosulfonate products, including such things as the above mentioned "MARASPERSE" materials, are good surfactant, dispersant, detergent and otherwise attractively-propertied materials that are commendable for a wide variety of uses, they still have certain intrinsic inadequacies and limitations leaving some desiderata and unfulfilled capability for use in many crucial applications and for expanded applicability in and for many highly advantageous purposes. Noteworthy amongst these are difficulties in the employment of the mentioned partial desulfonated lignosulfonates due to their relatively limited solubility in saline solutions plus their sometimes not totally satisfactory potential for having extraordinarily superb general surfactant exhibitions.

FIELD AND OBJECTIVES OF THE INVENTION

This invention pertains to and resides in the general field of ozonated or ozone oxidized lignosulfonate derivatives having greatly enhanced solubility, especially in saline environments and also having improved dispersant and surfactant properties. Amongst its principal aims and objectives are the provision of such ozone oxidized lignosulfonate products.

PARTICULARIZED DESCRIPTION OF THE INVENTION

The compositions of this invention are, basically, ozone oxidized derivatives of the above-described and identified lignosulfonates. Besides their unique chemical constitution, they are characterized in having a solubility — especially as regards saline solution tolerance or compatibility — at least 10 percent and usually 2 to 3 or more times greater than that of the lignosulfonate starting material from which the ozonized products of the present invention are derived; and a substantially increased, i.e., at least 10-fold and in many cases up to 30–50 times, surfactant and dispersant activity. Thus, the compositions of the invention are characterized further in being essentially or substantially completely soluble in aqueous saline solutions containing relatively large concentrations of sodium chloride and aqueous sulfuric acid solutions at pH ranges below 7 and as low as about 1.5.

The ozonated compositions are readily obtained by the direct ozone oxidation in strongly alkaline media of the referenced lignosulfonate starting materials. Ordinarily and most conveniently, this is done with ozone (present either in oxygen or air) in an aqueous alkaline solution of the starting material. Beneficially, mechanical agitation may be employed during the reaction (which augments by mechanical mixing or stirring the agitating effects of the oxidizing gas stream pressed into and passing through the reaction mass) at any desired suitable temperature. Because of the highly exothermic nature of the reaction, heating is literally never applied or necessary. In fact, especially to avoid as much as possible ozone hydrolysis and problems with material viscosity, cooling is generally necessary and employed (especially at the outset of the reaction). In general, the reaction can be conducted over a temperature range from about 0° C. to about 80° C., although it is ordinarily desirable to run it at the 20° C.–50° C. heat level. Ordinarily, a temperature on the order of 40°–50° C. is satisfactory for most of the ozonations done. The reaction is accomplished without requirement to use pressure apparatus for accomplishment.

The time of reaction generally varies with the relative quantity of ozone in the gaseous reactant stream. When the reaction temperature is too high, especially under higher alkalinity conditions in the reaction mass, the ozone tends to hydrolyze to oxygen thus forfeiting the desired high oxidation potential in the reaction mass. Usually, depending on relative proportions of ozone employed, the ozonations can be completed in as little as ½ hour or so or may require as much as 16 or more hours for completion. When conducted at about 40°–50° C., the ozonization is usually completed within about 2 to about 7 hours, depending upon the rate of introduction or addition of the ozone, on a quantitative basis, to the reaction mass. In this connection, it is generally preferably (and, from a pragmatic point of view, almost necessary) to gradually admit and add the total quantity of ozone to be utilized for the lignosulfonate oxidation over the entire period of reaction at either a constant or incremental rate. Along this line, slower introduction of the ozone is generally more advantageous and tends to yield seemingly more beneficial and ordinarily better attributed products. This is likely due to the avoidance thereby of oxidation conditions which may tend to be excessively harsh and possibly destructive. Thus, at about the 50° C. reaction temperature level, the time of reaction with rate of ozone feed accommodated thereto for any given total quantity of ozone to be utilized is oftentimes more desirably adjusted to longer periods within the indicated ranges. Of course and as is apparent from the foregoing and appreciated by those skilled in the art, lesser quantities of ozone utilized for the reaction can be well handled in shorter reaction time periods.

A highly advantageous procedure for conducting the considerably exothermic reactions which are encountered is to start with the aqueous lignosulfonate mass at about room temperature before commencing the ozone feed (even if this involves pre-cooling of the reaction mass); then to pass in the ozone to commence the exothermic reaction with subsequent refrigeration or cooling being employed to maintain the reaction mass, without overheating run-away, at or within the desired range of temperature.

As indicated, the ozone employed for the oxidation may be generated by well known techniques, either in pure or substantially pure oxygen or in air (which, although generally not done, can if desired by enriched with purposive additions of oxygen). Obviously, if desired it can also be obtained from pre-generated and stored supplies contained in a carrier gas, such as a fluorocarbon, or the like even though this is a generally relatively expensive and inconvenient manner of furnishing the oxidizing agent.

Generally, ozone generated in oxygen requires handling of smaller gas volumes to feed to and pass through the reaction mass. In illustration of this, ozone generated and contained in air typically provides only half the amount of ozone per cubic foot of ozone-containing gas compared to ozone in an oxygen medium. For example, if a given generator can provide, say, 40 lbs. per day of ozone from and in oxygen it will be generally capable of yielding only about 20 lbs. per day of ozone from and in air. On the other hand, an advantage of utilizing ozone in air is the avoidance thereby of the necessity of recycling, for reasons of economy, to preclude large losses of elemental oxygen remaining substantially pure after the large bulk of the ozone has been reacted therefrom. When air is employed for generation and carriage of ozone, the residual air after utilization of ozone in and for the reaction can ordinarily and without particular loss be directly vented to the atmosphere; usually requiring in this no more than a simple cleaning or scrubbing to remove residual traces of ozone as in and with potassium iodide or caustic solutions or any other alternative and equivalent reagennt which oxidizes or hydrolizes any escaping quantities of ozone in the escaping air stream.

The ozone concentration in the oxygen or air carrier can, for effective purposes, be as little as 0.1 or so wt. %, based on total gas composition weight, or as great as about 4 wt. %. Ozone generating efficiency, however normally tends to become relatively poor when higher ozone concentrations are involved; this being so in face of the general fact that the richer the ozone concentration the more reactive and volumetrically efficient is the ozone-containing oxygen or air supply or stream that is employed. Thus, for maximum overall efficiency in utilization of total energy involved (taking into entire account that required for ozone generation plus that required for effecting the ozonization reaction) an ozone concentration of about 2 wt. % to about 3 wt. % is ordinarily and on balance more desirable.

In practice of the present invention, only approximately about half of the total quantity of ozone employed is actually utilized in oxidizing attachment to the lignosulfonate being treated, although as little as about 40% of it to as much as 60% may in various instances enter into reaction. In any case, all of one of the oxygen atoms in the strong oxidizing agent ozone molecule is utilized in the reaction along with half of the ozygen atoms in the reamining oxygen molecule from the preliminarily reacted ozone.

Indicative of the foregoing is the typical reaction experience wherein, for example, 100 grams of a lignosulfonate is treated for oxidation with 9 grams of ozone. This usually results in the realization of from 104 to 106 grams of reacted lignosulfonate in the total solids obtained. Some of these solids can, in many instances, be comprised of as much as 1 wt. %, based on total solids weight, of an inorganic by-product such as sodium carbonate. This by-product may result in the caustic environment from 1± gram of the utilized ozone out of the 5 or 6 grams reacted causing and entering into demethylation reactions with the lignosulfonate material being oxidized.

Since there is no good way to titrate or analyze for reacted ozone and C, H, O determinations in the oxidized lignosulfonate are exceedingly tedious and difficult, the gravimetric take-up or oxidized attachment from the ozone is generally measured by material balance techniques using the (almost invariably reliably accurate) assumption that all the utilized ozone has gone into the oxidized lignosulfonate product. The material balance also takes into account the ozone involved in solution. From this ozone balance combined molecular oxygen from the ozone can be easily reckoned.

The lignosulfonate material being ozonated can be quantitatively treated over a relatively broad range to produce the enhanced compositions of the present invention. Ordinarily, very appreciable product amelioration is readily observable when the ozone take-up level in the lignosulfonate being oxidized is as little as about 2 wt. %, based on total lignosulfonate solids compositions weight. As much as 20 wt. % of the ozone take-up can be accomplished to give, in most cases, very excellent quality product; although in such instances it is frequently necessry to recycle the ozone or wastefully employ excessive quantities of it for the reaction since at more highly oxidized lignosulfonate levels the reacting efficiency of the ozone diminishes and increasingly larger porportions of the ozone feed tend to by pass the reaction mass without actually oxidizing the lignosulfonate being treated. This phenomenon generally commences to occur at about the 9-10 wt. % take-up level, despite the fact that product efficacy is oftentimes very noticeably and greatly improved when the extent of oxidation surpasses the indicated level. Advantageously, the wt. % take-up of ozone, based on total lignosulfonate solids weight, is between about 5 and about 15 wt. % with 9-10 wt. % usually being a most advantageous range.

The highly alkaline medium of the reaction mass, generally achieved with a strong caustic base such as sodium hydroxide, in which the ozonization is accomplished should have a pH of at least about 8 (and generally much more highly alkaline than that) to facilitate and accomplish the desired ozonization. This can be economically and effectively achieved by utilizing at least about 1 wt. % of NaOH in the aqueous reaction mass, based on the total weight of reaction mass involved, to as much as can be dissolved at the solubility limits of the caustic in the reaction mass. At any given desired level of free caustic in the reaction mass, the actual quantity to employ may be upwardly effected in particular instances, especially when acid lignosulfonate is being treated due to the effects of neutralization of such material. Good results are ordinarily had when the reaction mass contains from about 10 to about 15 wt. % of caustic, with a very desirable caustic concentration being on the order of 13 wt. % (at which point he pH of the reaction mass is 14).

While very desirable ozone oxidized lignosulfonate materials are prepared with the aqueous reaction mass containing, on a weight percent basis, of from about 35 to about 45 (advantageously approximately 40wt. % of dissolved lignosulfonate solids, the lignosulfonate concentration utilized can be as little as 10 wt. % to as much as 60 wt. % solids content (excepting, due to good dissolution requirements, in the cases where partially desulfonated lignosulfonates such as "MARASPERSE CB" are being ozonated wherein approximately 40 wt. % is a practical upper limit). It should also be considered in this regard that greater dilution conditions tend to lead to more easy and extensive oxidation results probably due to thereby increased availability of the reacting molecules to the oxidizing influence of the applied ozone in the reaction mass.

While it is not intended to be bound by any particular theory, it is believed that the ozone oxidation of lignosulfonate treatment conducted in accordance with the present invention actually involves two distinct types of reactions of the oxidizing oxygen with the reacting lignosulfonate. One of these goes relatively slowly and the other proceeds at a comparatively fast rate. The one reaction is a demethylation of the methoxyl units on the phenyl propane group in the lignosulfonate structure which splits out methyl entities. The other is the formation of carboxylic acid groups from the alcohol units in the lignosulfonate, the overall oxidation also forming phenolic groups in the lignosulfonate being treated. In instances, the ozone oxidation may also tend to split the pino-resinol groups in the lignosulfonate structure to result in phenyl propane occurrences in the oxidized lignosulfonate product. Ordinarily, practice of the practice invention does not result in any appreciable extent of desulfonation of the lignosulfonate being treated, especially if care is taken under particular conditions of the involved reaction too avoid a too drastic effect of the caustic present giving consideration in this to time and temperature factors along with caustic concentration utilized.

Surprisingly enough, very attractive and frequently even further enhanced results can be achieved by additionally sulfonating or resulfonating (following, for example, the general procedure and teachings in the referred-to copending Application) an already ozone oxidized sulfonated or desulfonated lignosulfonate product. When increased quantities of combined organic sulfonic sulfonate attachments are desired in such a doubly treated product it is frequently more advantageous to after-sulfonate an already ozone oxidized material rather than to ozonize a resulfonated or additionally sulfonated lignosulfonate. In this way there is avoided any proclivity for possible desulfonation when a highly sulfonated lignosulfonate is exposed to ozone oxidation reaction conditions. In any event, the doubly treated lignosulfonate products quite frequently show an additional improvement in particular enhanced properties of as much as 1½ times and more that which is evident in the solely ozone oxidized lignosulfonate material.

The resulfonated compositions, including the alkali metal salt derivatives thereof, are readily obtained by the direct sulfonation or sulfoalkylation of the referenced alkaline ozone oxidized, hydrolyzed, partially desulfonated lignosulfonate starting material. Ordinarily and most conveniently, this is done with appropriate sulfonating reagents in an aqueous solution of the starting material, advantageously using agitation during the reaction (which is better when applied vigorously and may be either by mechanical mixing or stirring and/or from the agitating effects of steam being pressed into the reaction mass when steam is used for heating), at any desired suitable temperature. In general, the reaction can be conducted over a temperature range from about 50° C. to about 200° C., although it is ordinarily desirable to run at least at the boil (i.e., about 100° C. or so) in order to avoid unduly long reaction times. Ordinarily, a temperature on the order of 160° C. is satisfactory for most of the resulfonations done. Of course, the reaction is accomplished under corresponding pressure when temperatures over boiling are utilized. The time of reaction generally varies with the temperature involved; lower temperature requiring longer times. At higher temperatures the resulfonations can be completed in as little as ¼ hour or so while temperatures at the lower end of the scale may require as much as 16 or more hours for completion. When conducted at about 160° C., the resulfonation cooling is usually completed within about an hour.

Any suitable sulfonation reagents may be used for the resulfonation reaction. When straight sulfonations are desired, they may be advantageously accomplished with an alkali metal (such as sodium) sulfite or sulfur dioxide. Sulfoalkylations, as are frequently quite desirable, are done with mixtures of an appropriate lower alkyl aldehyde and bisulfite. The sulfonate group, per se, that is attached in straight sulfonation is, of course —$SO_3H$. The sulfoalkylates, which ordinarily involve 1 to 3 carbon atom alkyl units, are of the structure —$(CH_2)_x$—$SO_3H$, wherein $x$ is usually an integer from 1–3 and when $x$ is plural the alkyl unit may be linear in attachment or, as is probably the more frequent case, comprised of side-chain arrangements.

The aldehyde utilized in at least approximately stoichiometric proportions with the bisulfite in the sulfoalkylations performed for the resulfonation is generally of the structure: RCH:O, wherein R is hydrogen or any desired 1–3 carbon atom-containing alkyl group. Obviously, if desired, mixed aldehyde reaction systems may be utilized even though there is ordinarily no particular advantage in this. Usually, it is very desirable to accomplish the resulfonation with sulfomethylating reaction using formaldehyde ($CH_2O$) and sodium bisulfite ($NaHSO_3$) as reagents so as to make sulfomethyl (—$CH_2SO_3H$) attachments in the resulfonated product.

As indicated, about stoichiometric relative proportions of the aldehyde and bisulfite reagents are employed for the resulfonation; these being used in amounts calculated to effect the desired extent or quantity of sulfonic acid units. in the finally obtained resulfonated product. Actually a plus or minus 20% tolerance from exactly stoichiometric ratios is tolerable. In sulfomethylating reactions, the amount of formaldehyde used may vary from about 1½ to about 12 wt.% of the desulfonated starting material being resulfonated while the bisulfite can correspondingly be utilized in quantities, on the same basis, of between about 5 and about 40 wt.%. A particularly desirable resulfomethylated product containing about 5½ wt. % of sulfur in organic sulfonic sulfonate form is obtained by the reaction in the described manner of "MARASPERSE CB" with about 15 wt.% of sodium bisulfite and 4½ weight % of formaldehyde, based on "MARASPERSE CB" weight, cooked for one hour at 160° C.

The resulfonated products of the present invention may, as desired, contain anywhere from about 1½ wt.% to 14–15 wt.% of total sulfur in combined organic sulfonic sulfonate form. Advantageously, the range of such sulfur is between about 2¾ and about 10 wt.% with greater desirability oftentimes attained in the sulfur wt.% range of from about 4½ to about 6½ wt.%.

EXEMPLIFICATION OF THE INVENTION

The following detailed Illustrations more particularly delineate and show the extraordinary benefits and advantages obtained in and by practice of the present invention and with the exceptionally useful and versatile ozone oxidized composition products obtained thereby.

FIRST ILLUSTRATION

A sample of "NORLIG 41" was employed for sulfomethylation followed by ozonization and, also and separately, unmixed ozonization. The "NORLIG 41", on a moisture-free basis, had (in wt. % based on total composition weight): a pH of 3.3 in 3% aqueous solution; total sulfur as S of 5.8%; sulfate sulfur as S of 0.1%; 5.1% of CaO, 0.3% of MgO; no $Na_2O$; 17.3% of reducing sugars; and 9.3% of —$OCH_3$ content — containing in aqueous liquid form about 53% solids with a Brookfield viscosity at 77° F. of about 100 cps and, in powder form, having about 6% water moisture content and a bulk density of 36 lbs. per cubic foot with a brown coloration to it.

Part of the liquid "NORLIG 41" was first sulfomethylated by cooling for one hour at 160° C with 15 wt. % sodium bisulfite and 4½ wt. % formaldehyde (following on a reduced scale the general procedure of the First Illustration in the referred to copending Application). The resulting additionally sulfonated lignosulfonate material then contained about 10.8 wt. % of total sulfur in combined organic sulfonic sulfonate form, based on final solid composition weight.

The additionally sulfonated portion of the "NORLIG 41" and another untreated portion thereof were then ozonated by first adding about 13 wt. % based on total aqueous solution weight, of caustic soda (NaOH) to each of the lignosulfonate solutions; then passing a mixture of about 2 wt. % of ozone in oxygen with supplemental stirring at an average reaction temperature of 40°-50° C. for about 2 hrs. The rate of ozone admission was such that a weight increase due to oxidation of the lignosulfonates by the ozone of about 9 wt. % was had in each of the ozonated portions.

Salt tolerance tests in extremely high concentration synthetic aqueous saline solution were then performed on each of the ozonated lignosulfonate materials, using a Salt Tolerance Standard Test for the evaluations. In each, the salt solution is made up in water to a total volume of 1 liter and is composed, in water, of 100 gms. of sodium chloride (NaCl), 12 gms. of calcium chloride ($CaCl_2$) and 8 gms. of magnesium chloride ($MgCl_2$). About 5 wt. % dispersant solutions of each of the ozonated lignosulfonate products being tested were prepared and the make-up manually shaken briefly to effect whatever preliminary dissolution could be achieved; after which it was put on a mechanical shaker for one hour to ensure as much solubilization as possible. Subsequent to that, a 10 ml. portion of each of the overall mixtures were placed into a graduated container tube from a standard laboratory-type DeLaval Centrifuge and centrifuged for 5 minutes thereon at 20,000 RPM. The volume percent of sludge found after the centrifugation (based on original volume of centrifuged material) was then measured. For purposes of comparison, a sample of the non-ozonated additionally sulfonated "NORLIG 41" starting material was also tested.

The volume percents of removed sludge after the centrifugations was: 9% for the non-ozonated but additionally sulfonated "NORLIG 41"; 5% for the straight and solely ozonated "NORLIG 41"; and 0.8% for the ozonated, additionally sulfonated "NORLIG 41".

Analogous results are obtained when the same saline solubility tests are repeated excepting to utilize, as the aqueous saline media; (i) 200 grams/liter NaCl solution; and/or "North Sea" water comprised, per liter, of 30.0 gms. NaCl, 1.16 gms. $CaCl_2$ and 5.54 gms. $MgCl_2$ (giving a total dissolved content of 36.70 gms./liter of such salts).

SECOND ILLUSTRATION

A sample (identified as "HWD-N") of a sugar-destroyed, 100% hardwood lignosulfonate in crude spent sulfite liquor form was obtained. Its analysis and characteristics were approximately comparable to that of a "MARASPERSE N-22" which was derived from a mixture of only 65% hardwood with a softwood balance for the pulping. Part of the "HWD-N" material was ozonated to the 9 wt. % level following the procedure of the First Illustration, this product being referred to as "HWD-N-$O_3$".

Each of the involved materials was then tested as a dispersant for Stellar clay according to the well-known, standard ASP-200 Stellar Clay Test using for the measurement a Fann Rotational Viscosimeter obtained from the Fann Instrument Company of Houston, Texas. Values for yield point, zero gel and Fann 600°, 300°, 200°, 6° and 3° settings were obtained. The data obtained, of course, represents the force required to move a stationary clay system through the plug flow to plastic flow condition in a pipe with the numerical measurements taken in lbs./100 ft.$^2$ of pipe surface; lower readings indicating better dispersant effect by the additive as the consequence of requiring less force for the movement of the mixture through the apparatus. The results were as follows:

|  | "HWD-N" | "MARASPERSE N-22" | "HWD-N-$O_3$" |
|---|---|---|---|
| Apparent Viscosity | 58 | 54 | 10 |
| Plastic Viscosity | 6 | 6 | 6 |
| Yield Point | 104 | *96 | *8 |
| ° Fann 600 | 116 | 108 | 20 |
| 300 | 110 | 102 | 14 |
| 200 | 104 | 99 | 12 |
| 100 | 94 | 95 | 10 |
| 6 | 63 | 74 | 6 |
| 3 | 56 | 58 | 6 |
| 0 Gel | 52 | — | 7 |

*It must be taken into account for result evaluation purposes that the Yield Point difference (i.e., 96 vs. 8) is extremely significant, as will be readily appreciated by those skilled in the art.

THIRD ILLUSTRATION

A number of experiments were performed involving oxidation of lignosulfonates with ozone. The ozone, absorbed in "FREON 13" carrier gas, was obtained in cylinders. The experimentation was for three purposes, including alteration of the lignin-lignosulfonate molecule to increase its effectiveness as a surface active agent. The experiments involved oxidation of hardwood liquors. The Method of Least Squares was utilized in a statistical evaluation of three variables on hardwood sodium "NORLIG 41" liquor. The variables included pH, ozone concentration and temperature. Evaluation was as dispersants for ASP-200 Stellar clay. Eight experiments adequately showed that pH and ozone concentration were critical variables. Using 5% ozone on hardwood spent sulfite liquor (i.e., SSL) gave a product six times more efficient on stellar clay than that attained with a "MARASPERSE N-22" material (65% hardwood) and 7.5 times better than with "HWD-N" type controls. Treatment with 15% ozone gave a product 14 times better than "MARASPERSE N-22".

The oxidation of ammonia base hardwood SSL with ozone (15%) also resulted in a product better than "MARASPERSE N-22" for Stellar City dispersion. The same was found to be true for a 5% ozonated calcium base "NORLIG 41".

The results obtained were as set forth in the following tabulation (with all percentages on a wt. % basis):

| Statistical Product Number | pH | Variables O₃ Take-Up | Reaction Temp. °C. | ASP-200 Stellar Clay Yield Pt. lbs./100 ft.² | ASP-200 600° Fann Reading |
|---|---|---|---|---|---|
| 1 | 7 | 10% | 25 | 72 | 80 |
| 2 | 4 | 15% | 35 | 28 | 44 |
| 3 | 10 | 5% | 35 | 92 | 118 |
| 4 | 10 | 15% | 15 | 18 | 30 |
| 5 | 4 | 5% | 15 | 114 | 146 |
| 6 | 8% NaOH | 5% | 15 | 52 | 68 |
| 7 | 12% NaOH | 5% | 15 | 14 | 28 |
| 8 | 12% NaOH | 15% | 15 | 6 | 18 |
| Controls: | | | | | |
| "MARASPERSE N-22" | | | | 82 | 98 |
| "HWD-N" | | | | 104 | 116 |
| Non-Statistical: | | | | | |
| NH₃ Base Hardwood SSL | 8% NaOH | 15% | 15 | 48 | 68 |
| Ca Base B-41 "NORLIG 41" | 8% NaOH | 5% | 15 | 42 | 54 |

The Graph in the accompanying Drawing, derived and plotted from the foregoing data, more particularly illustrates the improvement in product properties with increasing quantities of caustic soda in the "NORLIG 41" lignosulfonate reaction mass being ozone oxidized to the 5 wt. % level at a 15° C. temperature of reaction.

FOURTH ILLUSTRATION

Several series of different performance evaluations were made on various ozone oxidized and control products including a 9 wt. % ozone oxidized "HWD-N-O₃"; an alkaline (Kraft process) lignin material ozone oxidized to an approximate 10 % O₃ take-up pursuant to the teachings of U.S. Pat. No. 3,726,850 which contained no sulfur and was soluble in aqueous media at pH levels below 5 (identified as "KRAFT O₃"); "HWD-N" as a control; "MARASPERSE N-22", identified for brevity simply as "N-22" as another control; and "MARASPERSE CB", identified for brevity simply as "CB", as yet another control for further comparative purposes in certain of the test instances.

The various standard and well-recognized tests made, and the observations and results obtained therein, are identified and set forth in the following tabulations, wherein all given percentages are on a weight basis:

I. Evaluation of Dispersions -

1. (A). ASP-200 Stellar Clay Test (41% Solids)

| | % Dispersant (on Clay) | Apparent Viscosity | Yield Point | Fann 600° | Fann 3° | O' Gel Strength |
|---|---|---|---|---|---|---|
| "N-22" Control | 0.126 | 97 | 158 | 194 | 75 | 65 |
| "HWD-N" Control | 0.126 | 103 | 170 | 206 | 74 | 65 |
| "HWD-N-O₃" | 0.126 | 16 | 20 | 32 | 20 | 24 |
| "HWD-N-O₃" | 0.084 | 67 | 108 | 134 | 66 | 61 |
| "KRAFT O₃" | 0.126 | 22 | 32 | 44 | 26 | 28 |

1. (B). Additional ASP-200 Stellar Clay Tests

| | "HWD-N" | "N-22" | "CB" | PSI No. 2 "HWD-N-O₃" | "Kraft O₃" |
|---|---|---|---|---|---|
| Apparent Viscosity | 103 | 97 | 63 | 17 | 22 |
| Plastic Viscosity | 18 | 18 | 6 | 6 | 6 |
| Yield Point (Lbs/100 ft²) | 170 | 158 | 114 | 22 | 32 |
| Fann ° 600 | 206 | 194 | 126 | 34 | 44 |
| 300 | 188 | 176 | 120 | 28 | 38 |
| 3 | 74 | 75 | 60 | 21 | 26 |
| O Gel | 65 | 65 | 50 | 23 | 28 |
| 10' Gel | 65 | 66 | 50 | 26 | 28 |

2. "IDEAL" Type I Cement Test (15% NaCl Sol'n) (68.5% Cement) 1% Dispersant on Cement

| | Apparent Viscosity | Yield Point | Fann 600° | Fann 3° | O' Gel Strength | Retardation 1 hr | 2 hrs | 3 hrs | 20 hrs |
|---|---|---|---|---|---|---|---|---|---|
| "N-22" | 300+ | 300+ | 300+ | 10 | 8 | Thick Fluid | Thick Fluid | Thick Fluid | Gelled Set |
| "HWD-N-O₃" | 90 | 34 | 180 | 5 | 5 | | | | |
| "KRAFT O₃" | 42.5 | 11 | 85 | 11 | 15 | Thick | Thick | Thick | Gelled |

3. Calcium Carbonate ("ATOMITE") 50% Slurry Test

| | % Dispersant on Solids | Brookfield Viscosity CP | Fann Yield Point | Sediment (inches) |
|---|---|---|---|---|
| "N-22" | 0.25 | 130 | 3 | 0 |
| "HWD-N-O₃" | 0.25 | 27.5 | 1 | 0 |
| "HWD-N-O₃" | 0.125 | 125 | 5 | 0 |
| "KRAFT O₃" | 0.25 | 12.5 | 1 | 1/16" |

4. Titanium Dioxide TiO₂ ("TITANOL") 35% Slurry Tests

| | % Dispersant on Solids | Brookfield Viscosity, CP | Fann VG Yield Point | O' Gel | Sediment (inches) |
|---|---|---|---|---|---|
| "N-22" | 0.25 | 450 | 9 | 6 | 0 |

-continued

I. Evaluation of Dispersions -

| | | | | | |
|---|---|---|---|---|---|
| "HWD-N-O₃," | 0.25 | 7.5 | 1 | 0 | 0 |
| "HWD-N-O₃," | 0.125 | 490 | 10 | 7 | 0 |
| "KRAFT O₃" | 0.25 | 7.5 | 1 | 0 | 0 |

5. (A). Tests With Yellow Presscake No. 1 (American Aniline) And Eastone Blue GFD (Tennessee Eastman)

| | (*) Stain Evaluation | Yellow Presscake | | Eastone Blue GFD | |
|---|---|---|---|---|---|
| | | Oven 70° | Dried 95° | Dispersion | Heat Stability |
| "N-22" | 2 | Failed | Failed | Good | Failed |
| "HWD-N-O₃," | 1 | Passed | Passed | Good | Failed |
| "KRAFT O₃" | 3 | Excellent | Excellent | Good | Good |
| "CB" | 7 | Failed | Failed | Good | Good |

(*)Stain Rating: 0 = Best, No Stain 10 = Worst, High stain 5. (B). Additional Dye Evaluation Tests

| | Yellow Presscake (American Aniline) | | Eastman Blue GFD (Tennessee Eastman) | | Composite Standard |
|---|---|---|---|---|---|
| | Oven 70° | Dried 95° | Dispersion | Heat Stability | Fabric Stain Test |
| "CB" | Failed | Failed | Good | Good | Poor |
| "N-22" | Failed | Failed | Good | Failed | Good |
| "HWD-N-O₃," | Good | Good | Good | Failed | Excellent |
| "KRAFT O₃" | Excellent | Excellent | Good | Good | Good |

II. Evaluation of Emulsions

1. Kerosene - 25% oil in water
Dispersant - 1% based on water phase

| Product | Temp., °C. | Foam, 2 min. (cm.) | Stability Evaluation Break (cm. at top) | | |
|---|---|---|---|---|---|
| | | | 30 min. | 1 hour | 4 hours |
| "N-22" | 26 | 1.3 | 0 | 0.7 | 2.0 |
| "HWD-N-O₃," | 27 | 0.4 | 0 | 0.2 | 0.8 |

2. Carbon Tetrachloride - 25% oil in water
Dispersant - 1% based on water phase

| Product | Temp., °C. | Foam 2 min. (cm.) | Stability Evaluation Break (cm. at top) | | |
|---|---|---|---|---|---|
| | | | 30 min. | 1 hour | 4 hours |
| "N-22" | 26 | 2.5 | 0.7 | 1.6 | Broke |
| "HWD-N-O₃," | 26 | 0.9 | 0.3 | 1.1 | Broke |

3. Nitrobenzene - 25% in water
Dispersant - 1% based on water phase

| Product | Temp., °C. | Foam 2 min. (cm.) | Stability Evaluation Break (cm. at top) | | |
|---|---|---|---|---|---|
| | | | 30 min. | 1 hour | 4 hours |
| "N-22" | 26 | 0.5 | 1.5 | 2.0 | 4.7 (Broke) |
| "HWD-N-O₃," | 26 | 0 | 0.1 | 0.2 | 0.4 |

The intrinsic excellent properties and frequent superiority of products made in accordance with the present invention are easily discernible and plainly evident from the foregoing exemplifications and illustrations.

The ozone oxidized lignosulfonate products obtained by present practice are all found to be extremely useful and effective as improved dispersing agents for dyestuffs, clays and so forth and in and for ceramic refractory preparations; as well as for the emulsification of oils and various petroleum products and, additionally in many instances, as valuable and highly efficacious retarding agents for oil well cement compositions to control and regulate the setting thereof under high temperature and pressure conditions even in highly saline aqueous environments.

Similar very good results, using appropriate reagents for the purpose, are realized when the ozone oxidized products are made by first additionally sulfonating a given lignosulfonate or resulfonating a desulfonated lignosulfonate prior to ozone oxidation and/or, obversely, after-sulfonating an already ozone oxidized lignosulfonate material of any of the abovedescribed types and varieties using, in and for the sulfonation aspect, direct non-alkyl-group-containing sulfonations as well as sulfomethylations, sulfoethylations, sulfopropylations and so forth.

Many changes and modifications can readily be made and adapted in embodiments in accordance with the present invention without substantially departing from its apparent and intended spirit and scope, all in pursuance and accordance with same as it is set forth and defined in the hereto appended Claims.

What is claimed is:

1. An ozonated composition comprising:
a lignosulfonate that has been subjected to ozone oxidation in an aqueous alkaline medium;
said ozonated lignosulfonate containing, by weight, between 2 percent and 20 percent of total added combined oxygen in the oxidized lignosulfonate product,
said composition characterized in being substantially completely soluble in aqueous saline solutions and aqueous sulfuric acid solutions at pH ranges below 7 and as low as about 1.5.

2. An ozonated composition consisting essentially of:
a lignosulfonate that has been subjected to ozone oxidation in an aqueous alkaline medium,
said lignosulfonate containing between about ½ and about 15 percent, based on total unoxidized lignosulfonate solids weight, of organic sulfonic sulfur calculated as sulfur;
said ozone oxidized lignosulfonate having substituted therein, as the resulting oxidized units in abnormal proportions in the lignosulfonate material:
added carboxylic acid groups; and
added phenolic units
said ozonated lignosulfonate containing on a per cent by weight basis, based on composition weight, between about 2 percent and about 20 percent of total added combined oxygen in the oxidized lignosulfonate product.

3. The composition of claim 2, wherein there is between about 5 and about 15 wt. % of said total combined added oxygen.

4. The composition of claim 2, wherein there is between about 9 and about 10 wt. % of said total combined added oxygen.

5. The composition of claim 2, wherein said lignosulfonate is a resulfonated, alkaline oxidized, hydrolyzed, partially desulfonated lignozulfonate.

6. Method of making an ozonated lignosulfonate comprising:
contacting lignosulfonate starting material in an aqueous dispersion containing between about 10 percent to 60 percent of solids, based on the weight of the dispersion;
said aqueous dispersion also containing a caustic alkali in a concentration between about 1 percent, based on the weight of the dispersion and the saturation point of the caustic in the dispersion;
with ozone to effect ozone oxidation thereof, until the ozone take-up of the lignosulfonate as oxidized units added thereto during ozonization is between about 2 percent and about 20 percent, based on the weight of the ozone oxidized lignosulfonate product.

7. The method of claim 6, wherein said ozone is present in an air or oxygen carrier in a concentration therein of between about 0.1 percent and about 4 percent.

8. The method of claim 7 wherein said ozone is present in a concentration of from about 2 percent to about 3 percent.

9. The method of claim 7 wherein the temperature at which ozone oxidation is effected is between about 20° C. and 50° C.

10. The method of claim 6 wherein ozone oxidation is conducted for a period of between about ½ hour to about 16 hours.

11. The method of claim 7 wherein said temperature is between about 40° C. and about 50° C.; and
said ozone oxidation is conducted for a period of from about 2 hours to about 7 hours.

12. The method of claim 6, wherein the ozone take-up is between about 5 and about 15 percent.

13. The method of claim 6, wherein the ozone take-up is between about 9 percent and about 10 per cent.

14. The method of claim 6, wherein
the lignosulfonate starting material comprises an alkaline oxidized, hydrolyzed, partially desulfonated lignosulfonate; and
said aqueous dispersion contains between about 10 weight per cent and about 40 weight percent of dispersed lignosulfonate solids.

15. The method of claim 6, wherein
the lignosulfonate starting material comprises a resulfonated alkaline oxidized, hydrolyzed, partially desulfonated lignosulfonate; and
said aqueous dispersion contains between about 10 weight percent and about 40 weight percent of dispersed lignosulfonate solids.

16. The method of claim 6, wherein the lignosulfonate starting material contains between about ½ percent and about 15 weight percent, based on total unoxidized lignosulfonate solids weight, of organic sulfonic sulfur calculated as sulfur.

17. The method of claim 6, wherein the lignosulfonate starting material contains between about 1 ½ percent and about 10 weight percent, based on total unoxidized lignosulfonate solids weight, of organic sulfonic sulfur calculated as sulfur.

18. The method of claim 6 and including, in addition thereto and in combination therewith:
the additional step of introducing into the ozone oxidized lignosulfonate product by after-sulfonation to make up between about 1 ½ wt. % and about 15 wt. % of total sulfur in combined organic sulfonic sulfonate form, based on the weight of the resulting composition, of units of the formula:
—$(CH_2)_x$—$SO_3H$, wherein $x$ has a numerical integral value from 0 to 3.

19. The method of claim 18, wherein said resulfonation units are sulfomethyl groups of the structure —$(CH_2)SO_3H$.

20. The method of claim 18 wherein said resulfonation is accomplished in an aqueous reaction mass at a temperature between about 50° C. and 200° C. using as the resulfonation reagent and aldehyde of the formula:
RCH:O wherein R is hydrogen or an alkyl group containing from 1 to 3 carbon atoms in approximately stoichiometric admixture with a sulfite of the formula:
$XHSO_3$, wherein X is an alkali metal.

21. The method of claim 20 wherein
said aldehyde is formaldehyde and said sulfite is sodium bisulfite; and
said temperature is at least about 100° C for a period of from about ½ hour and about 16 hours.

22. The method of claim 6 wherein said ozone oxidation is conducted at a temperature within the range of 0° C. to 80° C.

23. The method of producing an ozone oxidized lignosulfonate comprising
contacting a lignosulfonate dispersed as solids in an alkaline aqueous medium in an amount by weight of from 10 percent to 60 percent
with ozone to effect oxidation of said lignosulfonate and an increase in weight of said lignosulfonate of from 2 percent to 20 percent.

24. The method of claim 23 wherein said lignosulfonate-containing, alkaline aqueous medium contains from 1 percent by weight of alkali to the maximum soluble concentration of alkali therein.

25. The method of claim 24 wherein said alkali is present in an amount by weight of from about 10 percent to about 15 percent.

26. The method of claim 25 wherein said alkali is present in an amount by weight of about 13 percent.

27. An ozonated lignosulfonate composition consisting essentially of
a lignosulfonate that has been subjected to ozone oxidation in an aqueous alkaline medium at a temperature within the range of 0° C. to 80° C. for a period of at least 30 minutes by means of a continuous ozone feed to said lignosulfonate;
said feed comprising a gaseous composition composed of oxygen or air and containing from 0.1 percent to 4 percent by weight of ozone;
said ozonated lignosulfonate containing, by weight, between 2 percent and 20 percent of total added combined oxygen in the oxidized lignosulfonate product;
said composition being further characterized by substantially complete solubility in aqueous saline solution.

28. An ozone oxidized composition as claimed in claim 27 wherein said ozone oxidation takes place at a temperature of from 20° C. to 50° C. for a period of 2 to 7 hours.

29. An ozone oxidized composition as claimed in claim 28 wherein the concentration of ozone in said feed is within the range of 2 percent to 3 percent by weight of said gaseous composition.

30. An ozone oxidized composition as claimed in claim 29 wherein said aqueous alkaline medium has a pH of about 14.

* * * * *